United States Patent Office 3,509,156
Patented Apr. 28, 1970

3,509,156
1,2-DIHYDRO-2-OXO-3-QUINOLINEACETAMIDES AND RELATED INTERMEDIATES
Peter H. L. Wei, Upper Darby, and Stanley C. Bell, Penn Valley, Pa., assignors to American Home Products Corporation, New York, N.Y., a corporation of Delaware
No Drawing. Filed Dec. 8, 1967, Ser. No. 689,002
Int. Cl. C07d 33/60
U.S. Cl. 260—287                                    5 Claims

ABSTRACT OF THE DISCLOSURE

This invention is concerned with 1,2-dihydro-2-oxo-3-quinolineacetamides which are pharmacologically active as central nervous system depressants.

---

This invention relates to new and novel quinolineacetamides. In particular, this invention is concerned with 1,2-dihydro-2-oxo-3-quinolineacetamides which have central nervous system depressant properties when tested under standard and acceptable pharmacological procedures. They are, therefore, deemed to possess utility in experimental and comparative pharmacology.

The new and novel compounds within the purview of the present invention are illustarted by the following formula:

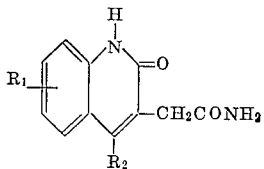

wherein $R_1$ is selected from the group consisting of hydrogen, sulfamoyl, halogen, lower alkyl and lower alkoxy; and $R_2$ is selected from the group consisting of hydrogen, lower alkyl, phenyl, halophenyl, lower alkylphenyl and lower alkoxyphenyl. As employed herein, the terms "lower alkyl" and "lower alkoxy" are meant to include both branched and straight chain moieties having from about one to about eight carbon atoms. Typical examples of the compounds of this inventiion are: 6-chloro-1,2-dihydro-2-oxo-4-phenyl-3-quinolineacetamide; 7-bromo-1,2 - dihydro-2-oxo-4-(4-tolyl)-3-quinolineacetamide; and 6-ethyl-1,2-dihydro-2-oxo-4-phenyl-3-quinolineacetamide.

The new and novel compounds of the present invention are prepared by the process depicted in the following reaction scheme:

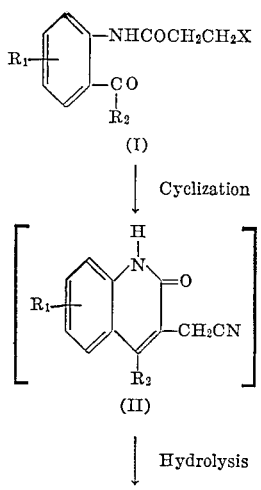

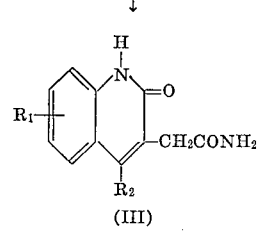

wherein $R_1$ and $R_2$ are defined as above and X is a halogen.

The cyclization and hydrolysis reactions are effected by contacting a 2'-carbonyl-3-halopropionanilide (I) in a water miscible solvent, e.g. an alkanol, tetrahydrofuran, and dimethoxyethane with an aqueous potassium cyanide solution at a temperature range from about 60° C. to about reflux temperatures for a period of about twelve to about twenty-four hours. Preferably this reaction is conducted in ethanol at reflux temperatures for a period of about eighteen hours.

When the cyclization and hydrolysis are complete, the resulting 1,2-dihydro-2-oxo-3-quinolineacetamide (III) is separated by standard recovery procedures. For example, the reaction mixture is filtered, the collected solid washed with water and an alkanol, and then recrystallized from a suitable solvent, e.g., dimethylformamide.

The intermediate shown in the above reaction scheme, a 1,2-dihydro-2-oxo-3-quinolineacetonitrile (II), is normally not isolated in the above reaction. However, if desired, said intermediate (II) may be separated by the procedure described in Example IV. Some of this intermediate (II) may be separated by conventional procedures from the filtrate of the above desired reaction. To increase the yield of the intermediate so separated, the above reaction may be conducted at lower temperatures for a shorter period of time. The 2'-carbonyl-3-halopropionanilides (I) employed as starting materials in the above described reaction may be prepared by standard organic procedures well known to those skilled in the art. For example, these compounds may be prepared by reacting a 2-aminophenyl alkyl or aryl ketone with a 3-halopropionyl halide.

The new and novel 1,2-dihydro-2-oxo-3-quinolineacetamides of the present invention possess valuable pharmacological activity. In particular, these compounds in standard pharmacological procedures demonstrate nervous system activity and are useful as depressants. Because of this property they are of importance in experimental and comparative pharmacology.

In the pharmacological evaluation of the central nervous system depressant compounds of this invention the in vivo effects of the compounds of this invention are tested as follows:

The compound is administered intraperitoneally to three mice (14 to 24 grams) at each of the following doses: 400, 127, 40 and 12.7 mg./kg. The animals are watched for a minimum of two hours during which time signs of general stimulation (i.e., increased spontaneous motor activity, hyperactivity on tactile stimulation, twitching), general depression (i.e., decreased spontaneous motor activity, decreased respiration) and autonomic activity (i.e., miosis, mydriasis, diarrhea) are noted. The animals are tested for changes in reflexes (i.e. flexor, extensor) and are rated by use of a pole climb and inclined screen for the presence of sedation-ataxia. The "Eddy Hot-Plate method" [Nathan B. Eddy and Dorothy Leimbach, J. Pharmacol. Exper. Therap. 107, 385 (1953)] is used to test for analgesia. The experiment is terminated by subjecting each animal to a maximal electroshock to test for anti-convulsant activity.

The compounds of this invention in the above test procedure induce decreased motor activity and sedative-ataxic effects at 400 mg./kg.; and anticonvulsant effects at 127 mg./kg. There were no deaths in the test animals at the highest dose used, 400 mg./kg., intraperitoneally.

The following examples are given by way of illustration and are not to be construed as limitations of this invention, many variations of which are possible without department from the scope and spirit thereof.

EXAMPLE I

To 129 g. (0.40 m.) of 2'-benzoyl-3,4'-dichloropropionanilide in 1 liter of ethanol, there is added a solution of 31.2 g. (0.48 m.) of potassium cyanide in 50 ml. of water. The solution is heated to reflux for eighteen hours. The insoluble material is collected, washed with ethanol and water to give 5.2 g. of product which is recrystallized from dimethylformamide to afford 6-chloro-1,2-dihydro-2-oxo-4-phenyl-3-quinolineacetamide, M.P. 315–320° C. (dec.)

*Analysis.*—Calcd. for $C_{17}H_{13}ClN_2O_2$ (percent): C, 65.20; H, 4.18; Cl, 11.35; N, 8.95. Found (percent): C, 65.29; H, 4.20; Cl, 11.2; N, 8.88.

In a similar manner, 7-bromo-1,2-dihydro-2-oxo-4-(4-toyl)-3-quinoline-acetamide; 1,2-dihydro-6-iodo-2-oxo-4-phenyl-3-quinolineacetamide; and 8-fluoro-1,2-dihydro-4-(4-methoxy- phenyl)-2-oxo-3-quinolineactamide.

EXAMPLE II

To 2'-benzoyl-3-chloro-4'-ethylpropiononilide (0.40 m.) in one liter of ethanol, there is added a solution of potassium cyanide (0.48 m.) in 50 ml. of water. The resulting solution is refluxed for twenty-four hours. Thereafter, the insoluble material is collected, washed with ethanol and water and then recrystallized from ethanol to give 6-ethyl-1,2-dihydro-2-oxo-4-phenyl-3-quinolineacetamide.

In like manner, 1,2-dihydro-6-methyl-2-oxo-4-phenyl-3-quinolineacetamide is synthesized.

EXAMPLE III

Repeating the procedure of Examples I and II to react an appropriate 2'-carbonyl-3-halopropionanilide with potassium cyanide the following compounds are obtained:

1,2-dihydro-2-oxo-4-phenyl-7-sulfamoyl-3-quinoline-acetamide;
4-(4-butylphenyl)-1,2-dihydro-2-oxo-3-quinolineacetamide;
1,2-dihydro-4-methyl-2-oxo-3-quinolineacetamide;
1,2-dihydro-2-oxo-4,7-dipropyl-3-quinolineacetamide;
4-(3-bromophenyl)-1,2-dihydro-6-methoxy-2-oxo-3-quinolineacetamide;
4-(4-chlorophenyl)-6-ethoxy-1,2-dihydro-2-oxo-3-quinolineacetamide;
7-butoxy-1,2-dihydro-4-(3-iodophenyl)-2-oxo-3-quinolineacetamide;
4-ethyl-1,2-dihydro-2-oxo-3-quinolineacetamide;
4-(4-ethylphenyl)-1,2-dihydro-6-methyl-2-oxo-3-quinolineacetamide; and
6-chloro-4-(4-ethoxyphenyl)-1,2-dihydro-2-oxo-3-quinolineacetamide.

EXAMPLE IV

A solution of 48.3 g. (0.15 m.) of 2'-benzoyl-3,4'-dichloropropionanilide and 11.7 g. (0.18 m.) of potassium cyanide in 300 ml. of dimethoxyethane containing 25 ml. of water is refluxed for nine hours and then let stand at room temperature overnight. After filtering off insoluble material, the filtrate is concentrated to dryness, the residue washed with hot benzene and recrystallized from dimethoxyethane, to afford 6-chloro-1,2-dihydro-2-oxo-4-phenyl-3-quinolineacetonitrile, M.P. 273–275° C.

*Analysis.*—Calcd. for $C_{17}H_{11}ClN_2O$ (percent): C, 69.25; H, 3.76; Cl, 12.04; N, 9.50. Found (percent): C, 69.50; H, 3.75; Cl, 12.18; N, 9.57.

What is claimed is:

1. A compound selected from the group consisting of those having the formula:

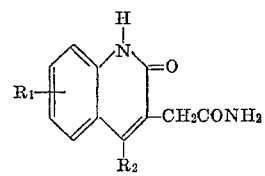

wherein $R_1$ is selected from the group consisting of hydrogen, sulfamoyl, halogen, lower alkyl and lower alkoxy; and $R_2$ is selected from the group consisting of hydrogen, lower alkyl, phenyl, halophenyl, lower alkylphenyl and lower alkoxyphenyl.

2. A compound as described in claim 1 which is: 6-chloro-1,2-dihydro-2-oxo-4-phenyl-3-quinolineacetamide.

3. A compound as described in claim 1 which is: 7-bromo-1,2-dihydro-2-oxo-4-(4-tolyl) - 3 - quinolineacetamide.

4. A compound as described in claim 1 which is: 6-ethyl-1,2-dihydro-2-oxo-4-phenyl-3-quinolineacetamide.

5. A compound as described in claim 1 which is: 1,2-dihydro-6-methyl-2-oxo-3-quinolineactamide.

References Cited

UNITED STATES PATENTS

| | | | |
|---|---|---|---|
| 1,941,312 | 12/1933 | Miescher | 260—287 |
| 2,435,173 | 1/1948 | Bavley | 260—287 X |
| 3,141,888 | 7/1964 | Loev | 260—287 X |
| 3,207,759 | 9/1965 | Creighton et al. | 260—283 |
| 3,362,954 | 1/1968 | Surrey | 260—287 X |

DONALD G. DAUS, Primary Examiner

U.S. Cl. X.R.

260—289, 562; 424—258